(12) United States Patent
Lampalzer

(10) Patent No.: US 8,284,392 B2
(45) Date of Patent: Oct. 9, 2012

(54) METHOD AND APPARATUS FOR THE THREE-DIMENSIONAL MEASUREMENT OF THE SHAPE AND THE LOCAL SURFACE NORMAL OF PREFERABLY SPECULAR OBJECTS

(75) Inventor: Ralf Lampalzer, Erlangen (DE)

(73) Assignee: 3D-Shape GmbH, Erlangen (DE)

( * ) Notice: Subject to any disclaimer, the term of this patent is extended or adjusted under 35 U.S.C. 154(b) by 649 days.

(21) Appl. No.: 12/014,278

(22) Filed: Jan. 15, 2008

(65) Prior Publication Data

US 2008/0225303 A1     Sep. 18, 2008

(30) Foreign Application Priority Data

Mar. 13, 2007  (EP) .................................... 07005091

(51) Int. Cl.
*G01N 21/00* (2006.01)

(52) U.S. Cl. ................................. 356/237.1; 356/237.2

(58) Field of Classification Search .................. 356/600, 356/601, 612, 237.1–237.6, 300, 312, 302–309, 356/317–320, 326, 332, 445; 250/226
See application file for complete search history.

(56) References Cited

U.S. PATENT DOCUMENTS

| | | | |
|---|---|---|---|
| 5,413,941 A | | 5/1995 | Koos et al. |
| 5,416,589 A | * | 5/1995 | Lysogorski ................... 356/601 |
| 5,436,718 A | * | 7/1995 | Fernandes et al. .............. 356/73 |
| 7,394,536 B2 | | 7/2008 | Sonda et al. |
| 7,489,396 B1 | * | 2/2009 | Vrhel et al. .................... 356/319 |
| 7,532,333 B2 | | 5/2009 | Haeusler et al. |
| 2004/0246473 A1 | * | 12/2004 | Hermary et al. .......... 356/237.1 |

FOREIGN PATENT DOCUMENTS

| | | |
|---|---|---|
| DE | 10014964 A1 | 1/2001 |
| DE | 19944354 A1 | 4/2001 |
| DE | 102004020419 B3 | 10/2005 |
| EP | 1750087 A1 | 2/2007 |
| JP | 2005134362 A | 5/2005 |
| WO | 2005119172 A1 | 12/2005 |

OTHER PUBLICATIONS

3D-Shape GmbH, "Optical 3D-Sensor for Specular Surface Measurement", SpecGAGE3D Information sheet, 2006.
Kammel, "Deflektometrie zur Qualitaetspruefung spiegelnd reflektierender Oberflaechen", tm—Technisches Messen Messen, vol. 70, 2003 (Apr. 2003), 193-198—English translation.
Pérard et al.: "Three-Dimensional Measurement of Specular Free-Form Surfaces with a Structured-Lighting Reflection Technique", Three-Dimensional Imaging and Laser-Based Systems for Metrology and Inspection III, Institut fuer Mess- and Regelungstechnik, Universitaet Karlsruhe (TH), Proc. SPIE vol. 3204, 1997, 74-80.
Petz et al.: "Measurement of Optically Effective Surfaces by Imaging of Gratings", Optical Measurement Systems for Industrial Inspection III, Institute of Production Measurement Engineering—iprom, Technische Universitaet Braunschweig, Proc. SPIE vol. 5144, 2003, 288-294.
Ritter et al.: "Contribution to Analysis of the Reflection Grating Method", Optics and Lasers in Engineering, Mechanics Center, Technical University of Braunschweig, vol. 4, 1983, 13-24.
Fujiwara et al.: "Flatness Measurement by UV moiré", Optomechatronic Systems II, Proc. SPIE vol. 4564, Oct. 2001 (Oct. 2001), 323-330.

* cited by examiner

*Primary Examiner* — Tri T Ton
(74) *Attorney, Agent, or Firm* — Laurence A. Greenberg; Werner H. Stemer; Ralph E. Locher

(57) ABSTRACT

An apparatus and a method permit the 3D detection of specular objects which are transparent to visible light. The method operates on the basis of the principle of deflectometry with specific improvements.

10 Claims, 3 Drawing Sheets

METHOD AND APPARATUS FOR THE THREE-DIMENSIONAL MEASUREMENT OF THE SHAPE AND THE LOCAL SURFACE NORMAL OF PREFERABLY SPECULAR OBJECTS

CROSS-REFERENCE TO RELATED APPLICATION

This application claims the priority, under 35 U.S.C. §119, of European application EP 07005091.9, filed Mar. 13, 2007; the prior application is herewith incorporated by reference in its entirety.

BACKGROUND OF THE INVENTION

1. Field of the Invention 3D sensors for the three-dimensional detection of shape are used in many applications. The measurement of specular surfaces is also possible with optical sensors. Surfaces of spectacle lenses or car windshields are examples thereof.

The optical measurement of specular free-form surfaces takes place through the use of methods which are referred to as "deflectometry." As is seen in FIG. 1, one or more cameras 8 are directed onto the specular surface of a measurement object 7 and there observe a reflected image of an extended lighting device 1, which is generally a structured screen, a matt sheet illuminated in structured fashion or a television or monitor which represents structures. The specular surface itself is not visible. By evaluating the structures of the reflected image, conclusions can be drawn as to the local inclination of the specular surface and therefore its shape.

Specific mention should be made of raster reflection methods [Ritter83] [Pérard97] [Kammel03]. In those methods, patterns are projected onto a screen.

[Pérard97] also proposes using a television or monitor as the screen. A distortion is usually determined by a series of displaced patterns.

If a sinusoidal pattern is used as the pattern [Häusler 99], a phase shift method can be used to evaluate the images. The required structures on the lighting device are then changeably horizontal or vertical strips. The tracing of a deflected beam 6, which is only available individually in the computation model, at the point of intersection of a vertical line with a horizontal line, takes place in accordance with the laws of reflection. The evaluation takes place in a suitable computation and evaluation unit.

Such an evaluation provides, as a measured variable, a combination of the local surface normal and the local height of the specular surface.

Additional measures are required for an absolute measurement. In [Petz03], the screen is displaced for that purpose. In [Knauer05], two cameras which are used for solving that problem each measure a different combination of height and surface normal.

The optical sensors which function deflectometrically are conventionally calibrated in accordance with photogrammetric methods. In the calibration, the location of the cameras, the inner parameters of the cameras and their lenses, the plane of the screen, and the location of the structures projected onto it are determined during the calibration. When all of those variables are known, the calculation of the profiles of the light beams 6, which is typical for the deflectometry is possible, from the matt sheet to the unknown object and then from the unknown object to the camera.

A measurement system which functions on the basis of that method is already available on the market for measuring aspherical lenses, in particular of spectacles [3DS06]. For that purpose, a screen formed of plastic which is used is illuminated by a video projector. The measurement accuracy for the local inclination of the surface is in the region of 5 minutes of arc.

When measuring specular objects 7 which are also transmissive to visible light, the problem of "rear side reflection" results. Light enters the object 7 and is reflected on optical interfaces positioned further inwards. That reflected light is not desirable; it adds to the light reflected on the surface and falsifies the measurement result. Normally, the rear side of a lens to be measured is that disruptive interface.

In the product [3DS06], that problem is solved by virtue of the fact that a) the surface of the rear side of the objects to be measured is roughened by being blasted with glass beads, b) the rear side is painted with a black color having a refractive index which corresponds to that of the object.

2. Disadvantages of the Prior Art

The methods described have the following problems which are solved in accordance with the invention:

a) Rear side reflection: the blasting of glass beads onto and blackening of lenses is a complex process, in which the lenses are also destroyed. Direct in-line monitoring of the lenses being produced is therefore not possible.

b) Problems when calibrating due to a deviation from the plane: the desired measurement accuracy of the systems in the region of a few minutes of arc presupposes precise calibration methods. The screen is approximated as the plane. The screens used are approximately 50 cm large and are not ideally flat (television screens or monitor displays, extended matt sheets formed of plastic). That is especially the case since they are subject to the influence of the force of gravity because, in general, the measurement object is inserted into the sensor horizontally, and the screen is mounted above it horizontally or inclined. The fact that the real shape of such screens deviates from a plane results in systematic errors in the measurement results. The imaging optical unit of a video projector also generally has distortion, with the result that the projected patterns or lines have slight systematic deformations.

c) Problems in the calibration due to different media: when using a television screen or monitor display as the screen, there is also the problem that a plastic or glass plate is located in front of the (imperfect) plane of image generation. It is not possible with the software which is generally used in photogrammetric calibration to take into consideration the presence of that plate. That likewise results in systematic errors.

d) Problems associated with the stability of the mechanism: televisions or monitors generally have housings formed of plastic. The same applies to video projectors. Fixing through the plastic housing is not mechanically immovably permanent, precisely also over relatively long periods of time, and results in deviations from the calibrated standard and therefore in measurement errors. With the video projector, it is also the case that the optical system is held in the plastic housing and therefore is not fixed reliably in relation to the light modulator.

e) Problems due to temperature influences: when using a television as the screen, it will heat up and expand once it has been switched on. When using a video projector, the image-producing light modulator in the video projector will heat up and expand once it has been switched on, as will the imaging optical unit located in the vicinity thereof. The compensation of those effects is complicated because, in addition, the temperature of the ambient air fluctuates, particularly under production conditions. Video projectors control their temperature in a closed control loop, with the result that the temperature, which is subject to the control process, of the light modulator, firstly fluctuates as a function of time and secondly depends on the temperature of the ambient air. That results in time-dependent and temperature-dependent measurement errors.

SUMMARY OF THE INVENTION

It is accordingly an object of the invention to provide a method and an apparatus for the three-dimensional measurement of the shape and the local surface normal of preferably specular objects, which overcome the hereinafore-mentioned disadvantages of the heretofore-known methods and devices of this general type and which are primarily used for solving the problem of rear side reflection without needing to destroy the measurement object. In some embodiments of the invention, the other mentioned problems can also be solved.

In accordance with the invention, light used for the deflectometry is preferably realized in a spectral range in which the measurement object is no longer transparent.

Soda-lime-silica glass is transmissive to ultraviolet radiation below 350 nm. BK7 glass is above approximately 290 nm. Plastic spectacle lenses contain partially UV-absorbent materials and, depending on the type, are sometimes no longer transparent even above 400 nm.

In the IR spectral range, the preferred wavelength range is determined by the available cameras. The most widely used bolometric cameras function in the wavelength range of 4-10 μm. In that range, the measurement objects formed of plastic and glass which are transparent in the visible range are not transmissive.

Reference is made to the fact that this description also mentions "light" or a "light bar" in the IR range. The terms are respectively used synonymously with "electromagnetic radiation in the IR range" and a "linear object for the emission of electromagnetic radiation in the IR range". In the UV range, the word "UV light" is in any case in common use.

In both spectral ranges, the consideration that the electromagnetic radiation can be allowed to enter the object up to a certain degree applies: the component of the radiation which results in a rear side reflection passes twice through the local object thickness. On that path, it needs to be absorbed. That is to say, the wavelength of the radiation can be selected in such a way that the radiation is weakened when it passes through twice the minimum object thickness until it reaches a residual amount which, in relation to the incoming light, is on the order of magnitude of the dynamic response of the camera and therefore does not produce any substantial errors.

In comparison with the UV range, the infrared range has the disadvantages of low optical resolution and depth of field (as a result of the considerably larger wavelength), the generally lower pixel number of the cameras and the higher price of the cameras.

It has the advantages of the lack of risk associated with the radiation for the human eye and the simple realization of the light bar. A further advantage can be seen to be that there are objects, for example plates, which have an optically rough effect in the visible range but reflect in the infrared range. The measurement of those objects using deflectometric methods is therefore only possible in the infrared range.

An embodiment of the invention functions with UV light just outside the transmissive spectral range of such spectacle lenses with such UV absorbent materials and is only suitable for measuring precisely these spectacle lenses.

It therefore has technical advantages due to the selection of the wavelength: such UV radiation can be produced more easily and can be imaged more easily with an optical unit formed of glass, and is also less hazardous for humans (risk of skin cancer above 320 nm).

According to the invention, the range of from 330 to 380 nm is selected as the suitable spectral range by a corresponding optical edge filter. A distance of 10 nm from the range which is hazardous for humans and 20 nm from the virtually completely transparent range of the spectacle lenses, is maintained. This distance is required due to the nonperpendicular characteristics of the optical edge filters.

In this spectral range, in accordance with one embodiment of the invention, a deflectometer which, in accordance with the prior art, includes a video projector and a matt sheet, can be converted into a UV deflectometer so that the problem of rear side reflection no longer exists: For this purpose, the sensitivity of the camera in the spectral range (just outside the spectral range in which the spectacle lenses with UV-absorbent materials are transmissive) needs to be ensured.

In addition, the edge filter needs to be introduced into the beam path for the purpose of connecting the long-wave (visible) light, preferably in the region of the camera lens, in order to filter away ambient light. This blocking filter should be transmissive precisely where the measurement object is not transmissive, for example at 380 nm. The optical system should use parasitic UV radiation from the video projector.

In addition, a UV blocking filter in the video projector can be removed or the color filter of a filter wheel which may be provided can be removed or, by changing the lamp, a projector lamp type can be used in which a UV-absorbent coating of the lamp is not present. If these additional measures are taken, the second edge filter is required at 330 nm for the protection of humans. Otherwise, it may be omitted because the blocking filters dedicated to the projector in any case do not allow any UV light to pass with a wavelength shorter than 330 nm.

Other features which are considered as characteristic for the invention are set forth in the appended claims.

Although the invention is illustrated and described herein as embodied in a method and an apparatus for the three-dimensional measurement of the shape and the local surface normal of preferably specular objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail, the following consideration results in embodiments of the invention without a video projector:

If the required light structures on the screen are changeably horizontal or vertical strips, the full resolution of a television or monitor of approximately 1000*1000=1 million pixels in principle is not required.

Figure 1:
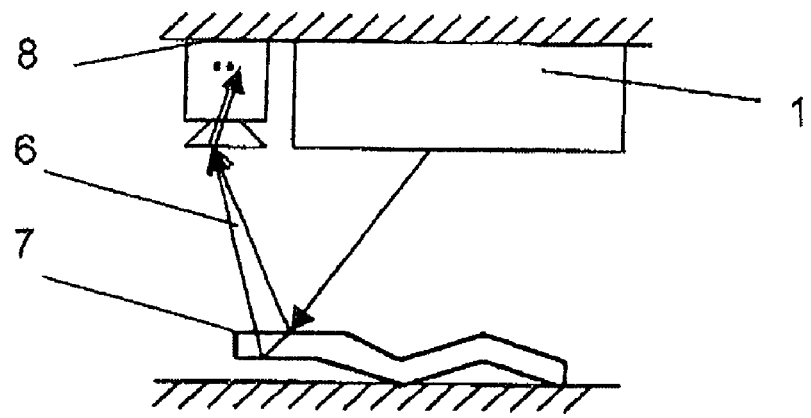
FIG. 1 is a diagrammatic, partly sectional, side-elevational view of a camera, measurement object and extended lighting device, illustrating the principle of deflectometry.
Figure 2:
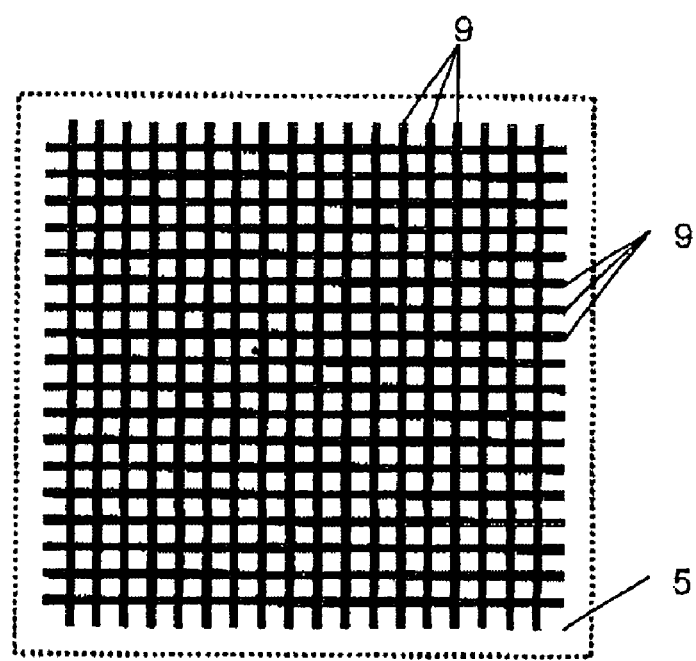
FIG. 2 is an elevational view of a virtual screen with imaginary strip-like pixels.

FIG. 2 shows that if there were a display with 1000 vertical "strip-like pixels" which can be superimposed in any way with 1000 horizontal virtually "strip-like pixels" 9, the lighting device could be realized with 2000 pixels instead of 1 million pixels on a virtual screen 5.

Such lighting devices are realized as follows in one embodiment of the invention illustrated in FIG. 3: a movable linear light bar 4 is moved stepwise with a linear adjusting device 3 at right angles to its longitudinal direction. This movement produces a virtual screen 5. Then, the configuration including the linear adjusting device and the light bar is rotated through 90° by a rotary movement device 2 in the plane of the virtual screen, and the movement of the light bar takes place repeatedly rotated through 90° in corresponding fashion.

Figure 3:
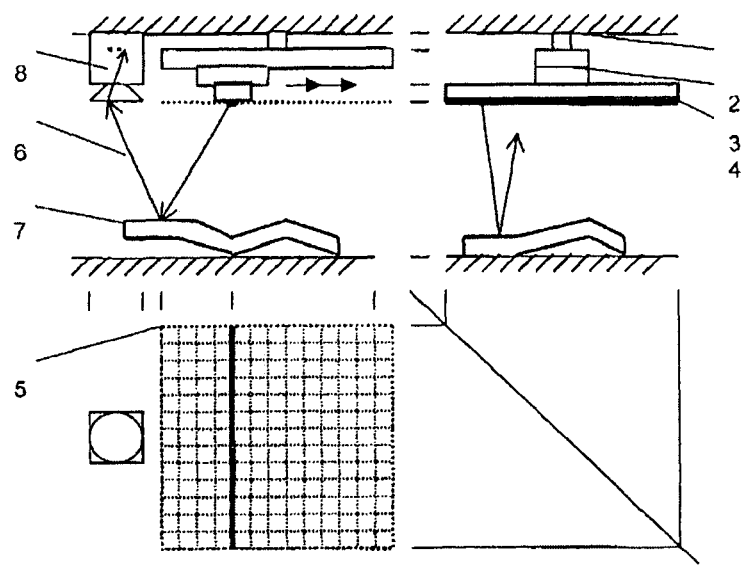
FIG. 3 is a view similar to FIG. 1 along with a front-elevational view, illustrating a first embodiment of the invention.

The corresponding apparatus is illustrated in FIG. 3 as a front and side view. The camera 8 is only illustrated in one view.

In this type of embodiment of the invention, the lighting unit therefore includes the rotary movement device 2, the linear adjusting device or spindle 3 and the light bar 4.

Such a realization, at first glance, has a few disadvantages: firstly, it is necessary to dispense with the use of inexpensive standard components (television, monitor, video projector). Secondly, the data recording time is extended because the coded lighting (projection of strips on the screen) is replaced by a sequential method. In addition, time is also required for the mechanical movement.

In relation to the data recording time, given the exemplary numbers, a data leadin of 2000 camera images would be required.

In a video system at 60 Hertz, assuming that the linear movement is possible at this cycle time and assuming that the 90° rotation requires 5 seconds, a data recording time of 38.3 seconds results. Spectacle lenses are produced in a cycle time of approximately 5 minutes, with the result that the disadvantage according to the invention is acceptable. It is described further below how the data recording time can be reduced.

However, the concept of the light bar opens up methods according to the invention for solving the problems mentioned above under "Disadvantages of the Prior Art" which are combined according to the invention with the use of the light bar:

As has already been mentioned, the emitted light of the light bar is preferably realized according to the invention in a spectral range in which the measurement object is no longer transparent.

In one embodiment, a linear fiberoptic cross-section converter is used. The conventional material for the fibers is quartz glass, which is still transparent to UV light (for example at 290 nm, in a spectral range which is not transmissive for the measurement objects formed of window glass). The UV light can be produced by using a suitable ultraviolet fiber lighting system. Camera lenses for UV are available, as are cameras which are UV-sensitive. Such UV-sensitive cameras have a scintillator material in front of a conventional silicon chip, i.e. are technically similar to the cameras for visible light. Further optical components are not provided in the system.

For example, the cross-section converter can be used to convert a round fiber bundle of approximately 14 mm in diameter into a light line having an equal area and having a geometry of 500 mm*1 mm.

Figure 4:
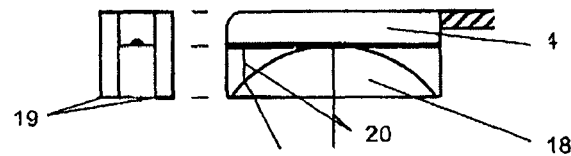
FIG. 4 is an elevational view of an optical element fitted in front of a light line, for examining a distance between the camera and the virtual screen.

As is seen in FIG. 4, in order to ensure that the aperture of the fibers is sufficient, central rays 20 of the individual glass fibers should be directed onto a relatively small localized measurement object. For this purpose, an optical element can be fitted in front of the light line, for example a quartz-glass sheet 18, which has been turned around and is in the form of a segment of a circle. It is possible for rectangular mirrors 19 to be pressed against the side faces thereof. The mirrors form a light tunnel.

In contrast to the procedure according to the invention, televisions or monitors with a UV image are not available. The construction of a UV video projector is very complex and UV video projectors are nowadays not commercially available. The path through the light bar according to the invention, however, opens up the possibility of a deflectometer in the UV range.

In a further embodiment of the invention, the light bar is realized in the infrared range. According to the invention, it is embodied by a tensioned heating wire.

Using a light bar, the problem of rear side reflection can also be solved when the wavelength of the light nevertheless enters the object to be measured and nevertheless is reflected on the rear side and nevertheless is imaged on the camera chip. Two lines are observed which can be separated by using suitable evaluation algorithms. After the separation, the maximum is determined for each line, and the shape of the front side and rear side of the object can be calculated in turn from this maximum in a suitable computation and evaluation unit using the methods corresponding to the prior art.

Figure 5:
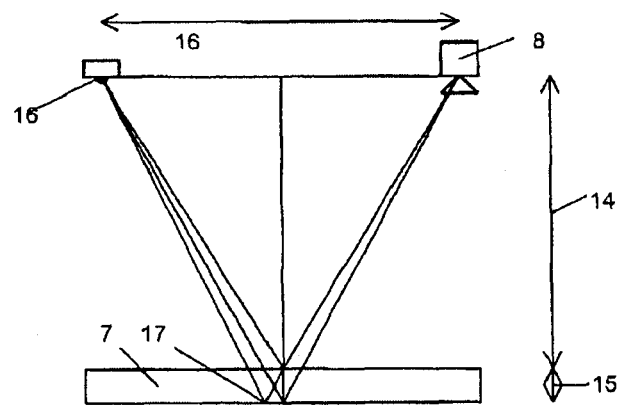
FIG. 5 is an elevational view of a gap-type diaphragm.

In order to separate the front and rear side reflection in the case of virtually planar objects, the invention specifies an instruction:

In a geometry having two symmetrical triangles as shown in FIG. 5, including a starting point on the light bar 4, reflection on the upper or lower side of the measurement object 7 and a node point of the camera 8, there is an object angular difference between the two observed reflections of $\alpha=\arctan(2A/B)-\arctan(2A/(B+D/n))$.

In this case, B=the length 16 of the base of the triangle, A=the distance 14 between the base of the triangle and the surface of the measurement object, D=the thickness of the measurement object, n=the refractive index of the measurement object, and D/n=the apparent thickness 15 of the measurement object.

In accordance with the laws of reflection, a deviation from the horizontal of one of the deflecting faces brings about a change of twice the angle in the case of the deflected beam.

The upper side or lower side can therefore have a deviation from the horizontal of less than $\alpha/2$ in order to ensure that the beams only coincide in the limiting case of a point with a deviation in the inclination of $\alpha/2$ from the horizontal 17 and can no longer be separated. Thus, according to the invention, the permissible deviation from the horizontal can be increased by the distance B being increased correspondingly.

Improvements with regard to the disadvantages b), c) and d) of the prior art discussed above dealing with problems in calibration and stability, are described below.

The planarity of the "virtual screen" 5 which is represented virtually in the course of the movement by the light bar, can be ensured with high precision. The light exit of a fiberoptic cross-section converter is produced by jointly polishing the fiber ends on the exit side. A glass face polished by a machine has good planarity.

Likewise, a tensioned heating wire is very straight if the tensile force is high in comparison with the weight of the wire and the possible spring forces in the material. The tensile force also needs to be maintained in the case of the thermal expansion of the wire as a result of heating. This can be achieved by using a tensioning spring.

The configuration should not leave the plane of the virtual screen once a rotation through 90° has been performed. For this purpose, it is necessary to ensure that, after the 90° rotation, the rotary movement device is firstly at right angles to the displacement direction and secondly at right angles to the longitudinal direction of the light bar. This can be ensured through the use of mechanical adjustment.

A mechanical adjustment step is therefore required in the construction of the described apparatus, for example through the use of:

(a) fitting a dial gauge in the front left-hand corner of the virtual plane,
(b) probing with the light bar, which extends from right to left, moved forward,
(c) probing with the light bar, which extends from the front to the rear, moved to the left and compensating with the height maintained in accordance with instruction (b).

An additionally disruptive glass pane in front of the light exit, such as in the case of a television or monitor, is not provided in the invention. Lens distortion is not provided. Instability due to the plastic housing is to be avoided.

Improvements with regard to the disadvantage e) of the prior art discussed above, dealing with problems due to temperature influences, are described below.

One advantage of the invention which is critical in practice is the fact that the scale representation in the described embodiment of the invention is ensured by a linear adjusting device. There are linear adjusting devices which fulfill their object of approaching a metric desired value with very high precision (for example through the use of integrated glass scales). The precision can also be ensured at different temperatures since temperature compensation can be integrated in those systems.

On the other hand, such a precision in the spatial coordinates is lacking in projected video images, for the reasons described.

FURTHER EMBODIMENTS OF THE INVENTION

The linear light source can also be realized in the UV range by an elongated linear gas discharge lamp which emits UV light being used. For this purpose, spectral lamps, which are in any case linear due to the geometry of optical spectrometers, can be used. There are corresponding products, for example, for the emission of the hydrogen spectrum, with a corresponding UV component.

Figure 6:
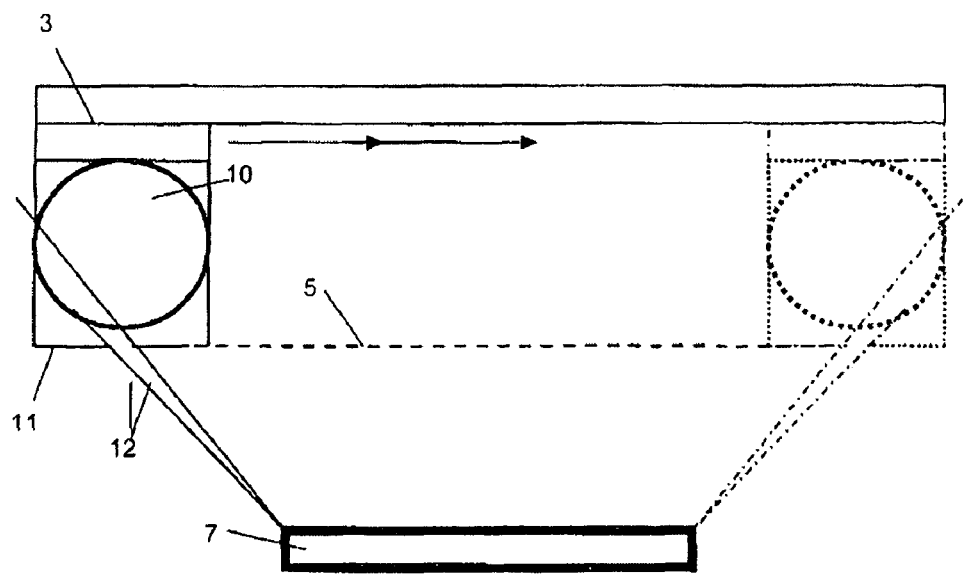
FIG. 6 is an elevational view of another gap-type diaphragm.

FIG. 6 shows wider but nevertheless linear gas discharge lamps 10 with UV light, which are also available. There are tubular UV gas discharge lamps, for example in the medical sector for disinfection purposes or for the treatment of skin diseases. If the lamps are wider than desired, in accordance with a further embodiment of the invention, they are suppressed by a gap-type diaphragm 11. The location of the gap is at the virtual location of the light emission, i.e. the plane which is produced by the gap being displaced by the linear adjusting device 3 forms the virtual screen. The gas discharge lamp 10 needs to be sufficiently close to the gap for the gap to be completely filled by the lamp given any desired position of the viewer of the measurement object and any desired position of the linear adjusting device 3. In FIG. 6, marginal rays of a deflected beam bundle 12 are used to represent the largest possible measurement object for which the gap is always completely filled by the lamp.

If the light bar needs to be relatively large (for example due to the cost-saving use of a conventional gas discharge tube which is too long), in accordance with a further embodiment of the invention, the measurement object is moved instead of the light bar, while the light bar rests. This is possible because only the relative movement of the light bar with respect to the measurement object is decisive for the method since the measurement object needs to deflect lines in two azimuths.

In the infrared range, the linear emission can be realized without the use of temperature differences, merely by different emission coefficients of the material. A line which is black (in the infrared range) on a specular (in the infrared range) surface (for example an aluminum sheet) is sufficient.

Heating of the two faces is advantageous because, in accordance with Planck's law, heating severely increases the emission of the two faces, with the result that the absolute difference in the radiation emission of the two types of face also increases.

Due to the following considerations, the method can be accelerated and sometimes the precision can be increased further.

Figure 7:
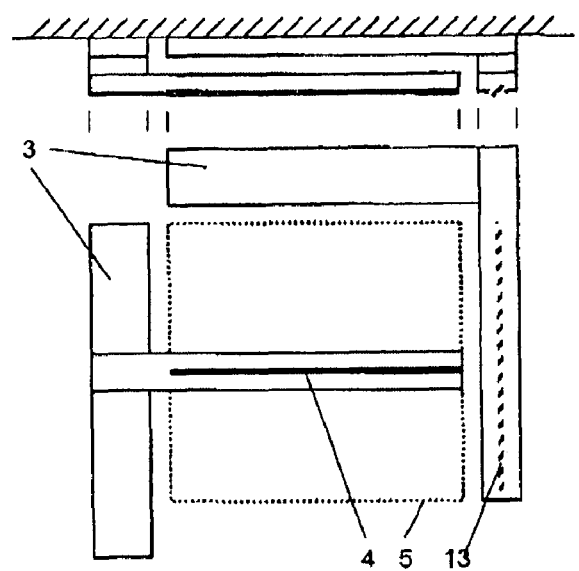
FIG. 7 is an elevational view of an embodiment with two linear movement units.

When using two linear adjusting devices 3, which are mounted in such a way as to be rotated through 90° with respect to one another, and two light bars, which are in each case mounted perpendicularly thereon, the rotary movement device and the time required for the rotation are not required. The light bars are moved successively through the virtual screen 5 shown in FIG. 7. It can be ensured that both light bars move in the same virtual plane by placing a parking position of an inactive light bar 13 outside of the movement range of the active light bar 4. A collision is thus avoided.

The omission of the rotary spindle results in two structurally identical simpler systems. Since the linear spindles 3 can be mounted directly on an anchoring plate, mechanical errors due to adjusting units resting on one another do not occur.

Instead of a linear light, a plurality of linear lights can be mounted for the purpose of accelerating the method. The distance between the linear lights needs to be dimensioned in such a way that the evaluation software can separate them. The number of light bars can be made higher, the more a priori information there is on the measurement object, for example when the planarity of flat glass is inspected a physical separation of a high number of linear lights is possible.

Upon further consideration of the original embodiment of the system with a rotary spindle and a linear spindle, the linear spindle can also be dispensed with given the continued existence of the rotary movement device. Then, a high number of light bars need to be mounted parallel next to one another, of which only one is switched so as to be lit or heated at one time. The number depends on the desired resolution, for example 1000. It is necessary to switch over between all light bars. The rotary movement device which is still provided can then ensure the 90° rotation.

This embodiment does not involve very high costs when using, for example, 1000 wires tensioned in parallel. A corresponding drive circuit is also simple to realize.

In addition to a parallel realization with tensioned wires, it is also conceivable to manufacture a printed circuit board which has (for example) 1000 parallel conductor tracks. Such a printed circuit board has dimensions in the region of 50 cm*50 cm and, for example, 1000 conductor tracks, i.e. a distance of 0.5 mm between the conductor tracks with a copper layer of 35 μm, for example.

The parallel realizations again allow for coded lighting in the lighting system as another way of saving time. The phase shift method can thus be realized with the parallel-tensioned wires or with the described printed circuit board.

For this purpose, a locally sinusoidal temperature distribution needs to be produced on the printed circuit board or in the plane of the parallel-tensioned wires. This takes place through the use of suitable sinusoidal driving of the wires or conductor tracks. The production of continuous temperature values required for this purpose can take place by controllable current levels in the wires or conductor tracks or by pulse width modulation of a specific current level in the wire or conductor track.

In this embodiment of the invention, a realization in the spectral range which can enter the object with subsequent separation of the two reflections is no longer possible since an evaluation with physical separation does not allow areal lighting.

Finally, parallel-tensioned wires can also be realized in such a way that they are tensioned crosswise at 90°. Any mechanical spindle is therefore not required, and the corresponding time which is required for its movement is not required. An embodiment as illustrated in FIG. 2 is therefore directly possible. The wires need to be insulated from one another, for example by using enameled copper wire and by not exceeding the melt temperature of the enamel. Driving is possible individually or on the basis of the phase shift method. The crossed wires cannot be located precisely in one plane, as a result of which measurement errors result. The other advantages (in particular avoidance of the rear side reflection) are retained, however.

The invention claimed is:

1. A method for measuring a surface of a measurement object on the basis of the principle of deflectometry, the method comprising the following steps:
    providing a displaced, rotated or switched-over lighting device having at least one spatially linear source for electromagnetic radiation;
    providing an observation device having at least one camera sensitive to the electromagnetic radiation for recording a series of reflected images of the displaced, rotated or switched-over lighting device;
    rotating the at least one linear source for electromagnetic radiation or the measurement object through 90° with a rotary movement device;
    recording, with the observation device, the reflected images of the lighting device produced by reflection of the lighting device on the surface of the measurement object; and
    determining an inclination of the surface of the measurement object from a shape of the reflected images;
    wherein the at least one linear source for electromagnetic radiation is a plurality of lines applied to a background, the lines and the background having the same temperature, and the lines having a higher emission than the background due to a higher emission coefficient of a surface of the lines.

2. An apparatus for measuring a surface of a measurement object on the basis of the principle of deflectometry, the apparatus comprising:
    a displaced, rotated or switched-over lighting device having at least one linear source for electromagnetic radiation;
    a rotary movement device for rotating said at least one linear source for electromagnetic radiation or the measurement object through 90°;
    an observation device viewing a reflected image of said lighting device produced by reflection on the measurement object, said observation device having at least one camera sensitive to the electromagnetic radiation for recording a series of reflected images of said displaced, rotated or switched-over lighting device; and
    a computation and evaluation unit determining an inclination of the surface of the measurement object from a shape of the reflected image and a known location of said lighting device;
    wherein said at least one linear source for electromagnetic radiation is a plurality of lines applied to a background, said lines and said background having the same temperature, and said lines having a higher emission than said background due to a higher emission coefficient of a surface of said lines.

3. The method according to claim 1, wherein the at least one linear source of electromagnetic radiation is a fiberoptic cross-section converter having quartz-glass fibers, into which UV light is injected by a fiber lighting system, or by a tubular gas discharge lamp, and emits ultraviolet radiation.

4. The apparatus according to claim 2, wherein said at least one linear source of electromagnetic radiation is a fiberoptic cross-section converter having quartz-glass fibers, into which UV light is injected by a fiber lighting system, or by a tubular gas discharge lamp, and emits ultraviolet radiation.

5. The method according to claim 1, which further comprises displacing the at least one linear source for electromagnetic radiation or the measurement object with at least one movement device, preferably perpendicularly relative to a linear direction.

6. The apparatus according to claim 2, which further comprises at least one movement device for displacing said at least one linear source for electromagnetic radiation or the measurement object, preferably perpendicularly relative to a linear direction.

7. The method according to claim 1, wherein the at least one linear source for electromagnetic radiation is a plurality of heated conductor tracks on a printed circuit board.

8. The apparatus according to claim 2, wherein said at least one linear source for electromagnetic radiation is a plurality of heated conductor tracks on a printed circuit board.

9. The method according to claim 1, wherein the lighting device has a plurality of linear sources for electromagnetic radiation being driven sequentially in time and individually or in groups.

10. The apparatus according to claim 2, wherein said lighting device has a plurality of linear sources for electromagnetic radiation being driven sequentially in time and individually or in groups.

* * * * *